G. I. KOHR.
PICK-UP AND SEPARATING MACHINE.
APPLICATION FILED MAR. 16, 1920.
1,385,874.
Patented July 26, 1921.
2 SHEETS—SHEET 1.
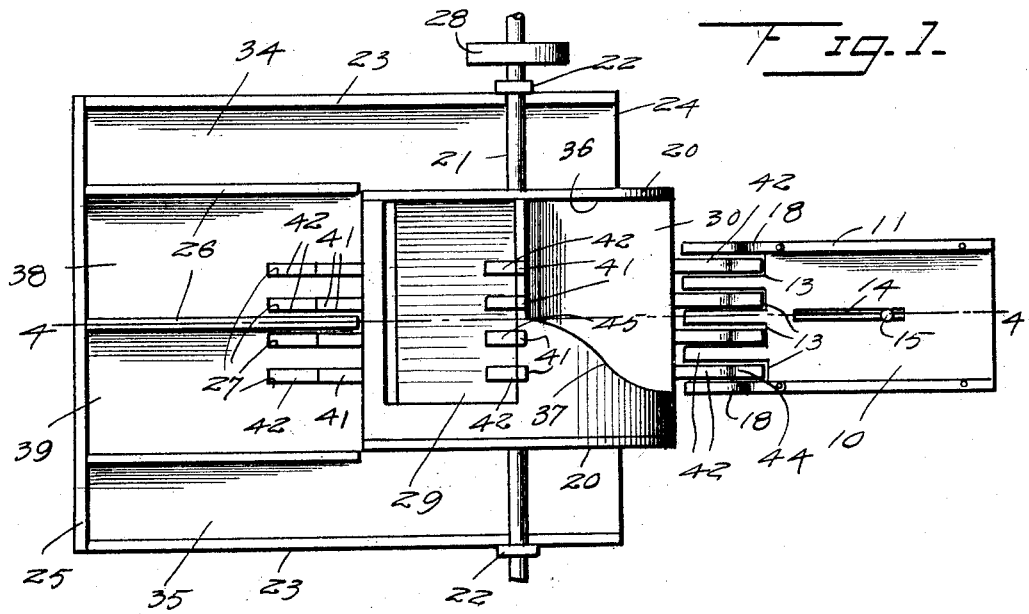
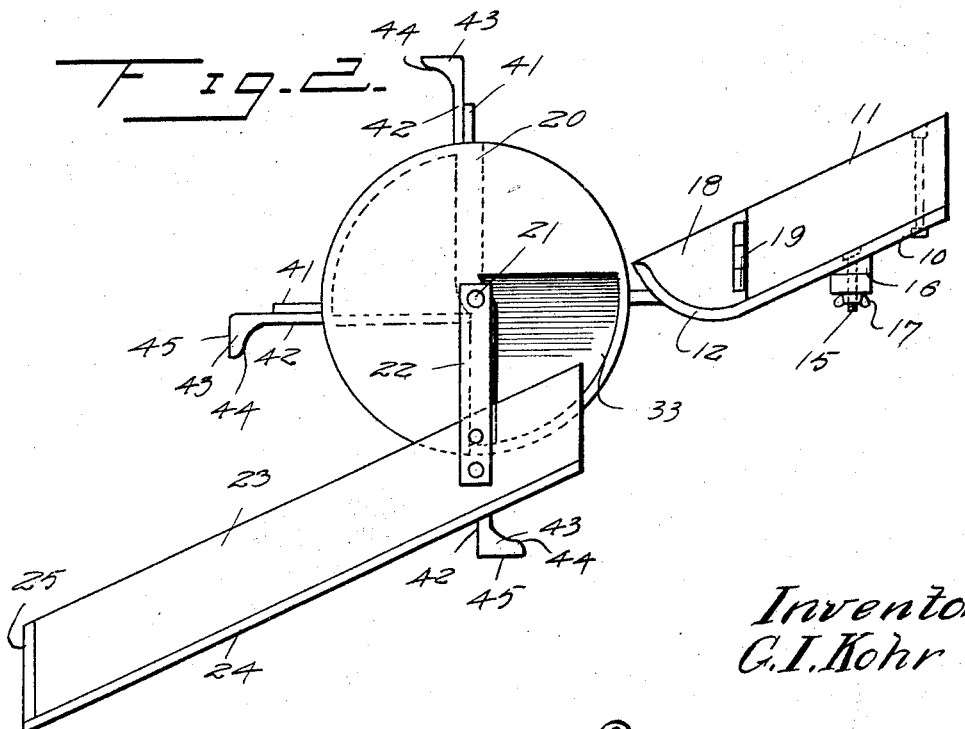
Inventor
G. I. Kohr

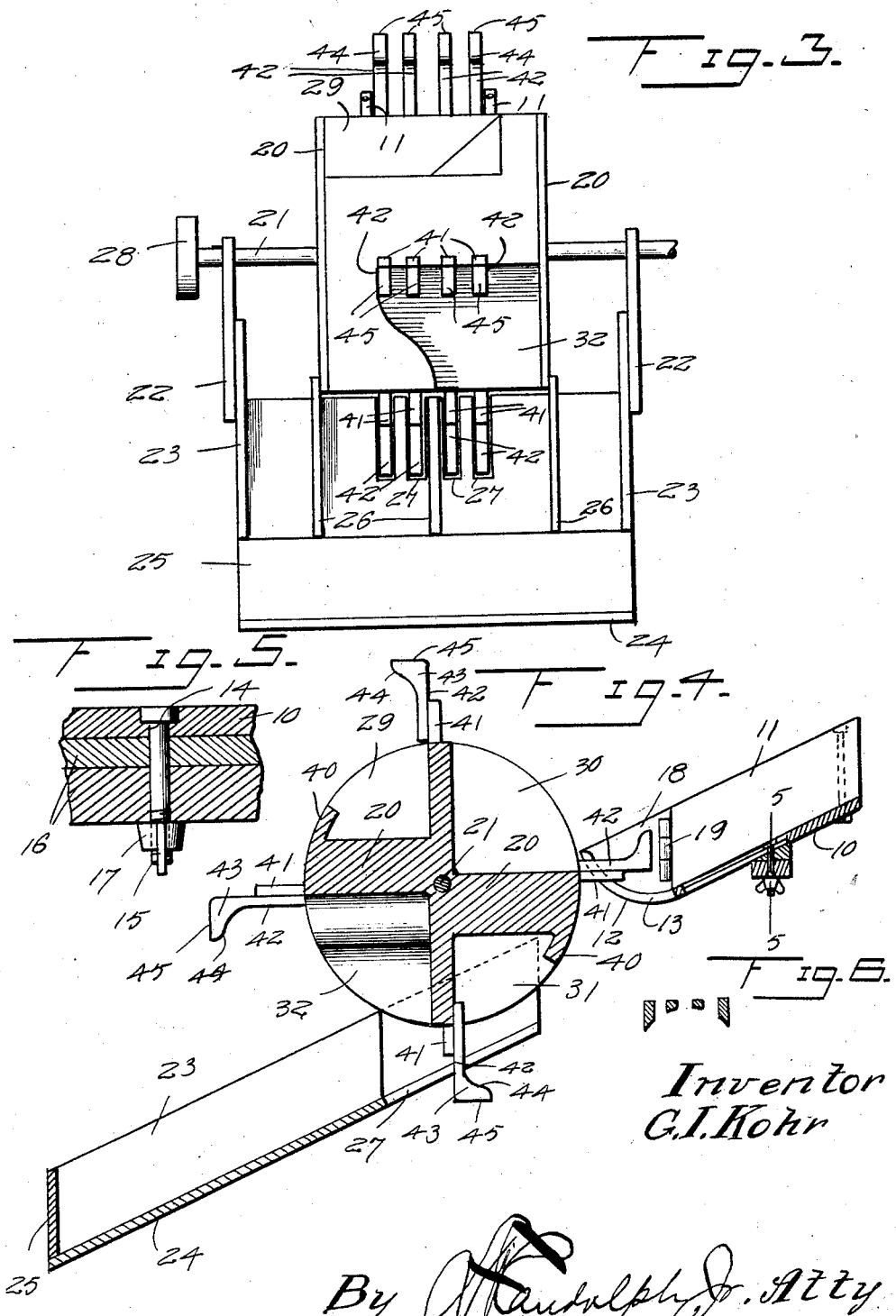

UNITED STATES PATENT OFFICE.

GRANVILLE I. KOHR, OF YORK, PENNSYLVANIA.

PICK-UP AND SEPARATING MACHINE.

1,385,874.  Specification of Letters Patent.  Patented July 26, 1921.

Application filed March 16, 1920. Serial No. 366,442.

*To all whom it may concern:*

Be it known that I, GRANVILLE I. KOHR, a citizen of the United States, residing at York, in the county of York and State of Pennsylvania, have invented certain new and useful Improvements in Pick-Up and Separating Machines; and I do hereby declare the following to be a full, clear, and exact description of the invention, such as will enable others skilled in the art to which it appertains to make and use the same.

This invention relates to certain new and useful improvements in pick-up and separating machines adapted for picking up articles such as dough balls and feeding the articles into separate compartments from which they may be removed by operators, thus permitting the dough balls to be fed into the main feeding chute faster than a single operator can handle them, the pick-up device serving to remove the dough balls from the main feeding chute and then depositing them in the separate compartments.

The invention has for another object, the construction of a drum and fingers for the separate compartments of the drum and arranged so that all of them may be positioned to pass in operative relation to the main feeding chute and remove the dough balls from the same one at a time, the dough balls passing into the compartments of the drum from which they will be deposited into the separate compartments of the table for removal by the operators.

A further object of the invention is to provide a pick-up and separating machine of the above stated character in which the main feeding chute may be readily adjusted according to the size of dough balls or other articles placed therein.

The invention has for a further object, the provision of a pick-up and separating machine of the above stated character in which will be provided a novel form of drum having pockets, certain of which may discharge their articles from the ends of the drum while the remaining pockets or compartments discharge their articles from the open sides thereof through which the articles were received.

The invention has for a still further object, the provision of a pick-up and separating machine of the above stated character which will be of comparatively simple construction and operation, inexpensive and highly efficient in use.

With the foregoing and other objects in view, as will be apparent as the description proceeds, the invention consists in the novel construction, combination and arrangement of coöperating parts as hereinafter more specifically set forth, claimed and shown in the accompanying drawings, in which—

Figure 1 is a top plan view of the improved machine.

Fig. 2 is a view showing the machine in side elevation.

Fig. 3 is a front elevation of the improved machine.

Fig. 4 is a vertical sectional view, taken on the plane of line 4—4 of Fig. 1.

Fig. 5 is an enlarged detail section taken on the plane of line 5—5 of Fig. 4.

Fig. 6 is a detail sectional view through the fingers for one of the pockets of the drum to show the manner in which the working faces or upper side faces are curved so as to prevent the dough balls or other articles from rolling off the sides of the pick-up fingers.

Referring more in detail to the drawings in which similar reference characters designate corresponding parts throughout the several views, 10 indicates the inclined main feeding chute having a flat bottom and upstanding sides 11, the flat bottom being curved upwardly at its lower end, as shown at 12 and provided with spaced longitudinal slots 13, the purpose of which will presently appear. The main chute 10 or feeding chute has an elongated slot 14 extended longitudinally in its bottom or main portion and through which is extended or engaged the supporting screw 15 which also extends through the stationary supporting members 16 and has a thumb nut 17 or the like threaded on its lower end so that the main feed chute 10 may be readily secured in its adjusted position. The lower ends 18 of the sides 11 are hinged to the main portion thereof, as shown at 19, the purpose of which will be readily apparent.

The drum 20 is mounted upon a rotatable shaft 21 which has bearings in the upstanding portions 22 secured to the opposite members 23 of the divided receiving trough, or operating table 24 which latter is also inclined in a plane slightly below the plane of the main feed trough 10 but substantially parallel thereto, the upper end of the divided trough or operating table 24 being spaced slightly below the lower end 12 of the main chute 10, as shown in Figs. 2 and 4 of the drawings. The dividing trough or operating table 24 also has a lower end wall 25 and three short longitudinal partitions 26 extended from the lower end member 25 toward the upper open end of the divided trough or operating table and for about one half the length of the table or trough, the purpose of which will presently appear. The divided trough or operating table 24 has downwardly extended longitudinal slots 27, which extend to a short distance below the upper ends of the partitions 26, the slots being preferably arranged so that two appear on each or other side of the central partition 26. It is also to be understood, by reference to Figs. 1 and 3 of the drawings that in this preferred form of the invention three partitions are employed, thereby dividing the trough or operating table into four compartments of substantially the same size or width. It is also to be noted that the slots 27 will be in substantial alinement with the slots 13, the purpose of which will presently appear.

The shaft 21 is so mounted above the upper end of the divided trough or operating table 24 that the drum 20 may rotate within the upper end of its trough, upwardly of the upper end of the partition 26, as shown in Fig. 1 of the drawings. The shaft 21 may be provided with a belt wheel 28 or the like so that the shaft 21 may be rotated by any suitable power.

The drum 20 is preferably a solid drum with pockets formed therein, practically one fourth of the drum being used for pockets and every one of the four pockets having one open side opening on to the periphery of the drum, as will be understood by referring to Figs. 1 and 3 as well as Fig. 4 of the drawings. The pockets in the drum 20 are numbered 29, 30, 31 and 32 respectively, the pockets 29 and 31 being located in diametrically opposite portions of the drum 20 and opening upon the outer periphery thereof, as shown in Figs. 1, 3, and 4. Each of the pockets 29 and 31 has one straight wall and an inclined bottom wall which extends from one end of the pocket downwardly to the other or open discharge end 33 thereof, as shown in Fig. 2 of the drawings so that each end pocket may discharge into one end of the end or side compartments 34 or 35 of the divided trough or operating table 24. The drum is so positioned that the end pocket 29 may discharge in the side compartment 34 while the end compartment 31 may, after a half revolution of the drum 20, discharge its contents into the side compartment 35 of the divided trough or operating table 24. Pockets 30 and 32 of the drum are positioned at diametrically opposite points of the drum and between the end pockets 29 and 31 as clearly shown in Fig. 4 of the drawings. Each of the pockets 30 and 32 is also provided with a straight wall which is termed a long straight wall and a short straight wall at right angles to the long straight wall, as will be readily understood by referring to Figs. 1 and 3 of the drawings. The pockets 30 and 32 are also provided with a straight end wall 36 at one end or edge of the drum 20 while the opposite end wall 37 describes a compound curve, as shown clearly in Figs. 1 and 3 of the drawings, thereby making one side of each of the pockets 30 and 32 narrower than the other side. The pockets are so arranged that the straight wall 36 of these pockets is at one side of the drum and the straight wall of the other pocket at the opposite side so that as the drum rotates the pocket 30 will deposit its contents in the compartment 38 and the pocket 32 will deposit its contents in the compartment 39 of the divided trough or operating table 24. It will therefor be seen that the pockets 30 and 32 empty into the inner compartments 38 and 39 while the end pockets 29 and 31 empty into the compartments 34 and 35 of the divided trough or operating table 24. It will also be seen that each of the pockets 29 and 31 has a curved outer wall 40 over which the contents of the pockets 29 and 31 will be prevented from passing as they travel down the inclined bottom wall of these pockets to the outlet or discharge opening for the pocket in the side or end of the drum 20.

Finger supporting members 41 project radially from the straight walls of the four pockets and which may be termed the partition walls to support the radially extended fingers or pick-up members 42 which are preferably arranged in sets of four for the four different pockets. The fingers or pick-up members 42 have enlarged and laterally extended heads 43 formed on their outer extremities with rounded working faces 44. The four fingers or pick-up members 42 for each pocket of the drum are curved transversely on their upper or working side edges, as clearly shown in Fig. 6 of the drawings so as to prevent the dough balls or other articles picked up by the fingers or pick-up members 42 from rolling off of the side thereof instead of properly directed to the pocket of the drum over which the fingers are extended, and the drum rotates. The advantage of curving these fingers in this manner for each pocket will be readily apparent as the description proceeds. These fingers are adapted to pass upwardly through the slots 13 in the main feed trough 10, as shown in Fig. 1 and also Fig. 4 of the drawings to gather or pick up the articles such as balls of dough from the lower curved end of the main feed trough 10. The four fingers for each compartment will pass upwardly through these slots to pick up one of such articles for the pocket for which the fingers are provided and as these fingers continue to move upwardly to horizontal or upstanding position during continual rotation of the drum 20, this article will roll from upon the same to the pocket over which the fingers are projecting. Then, as the drum 20 continues rotation, the article will roll within the pocket in which it has been thrown or deposited and pass out of the outlet side or end of the pocket as the case may be, into the proper compartment of the divided trough or operating table 24, as previously described. The fingers will then pass downwardly through the slots 27 of the bottom of the divided trough or operating table 24 and continue moving in an arc until they again reach the slots 13 of the main trough 10 to again pass upwardly therethrough and take up another article. It will therefore be seen that the set of arms for the various pockets in the drum 20 will pass through the slots 13 and 27 in succession to pick up the articles for the different pockets of the drum and deposit them in the proper compartments of the divided trough or opperating table 24 as long as the drum is rotated and articles are fed downwardly in the main feed trough 10 to the lower upwardly curved end thereof. It will be seen that the heads 43 of the fingers or pick-up members 42 are extended outwardly past the ends of the supporting members 41 and have their outer ends 45 flattened so that the finger or pick-up members may readily pass through the slots 13 and 27, the curved or pointed portion 44 moving in advance of the main or body portions of the fingers so as to properly pick up the articles and deposit the same in the pockets of the drum 20. It will be understood that the speed of rotation of the shaft 21 may be readily regulated in accordance with the speed of movement of the articles in the main feed trough 10 and the articles thereby picked up from the lower end 12 of the main feed trough 10 and deposited in the four separate compartments in the divided trough or operating table 24 to be removed by several operators at a greater speed than could be accomplished by a single operator receiving the articles directly from the main feed trough 10.

It is believed that the complete construction and operation of this machine will be readily understood by a careful study of the foregoing paragraphs in connection with the accompanying drawings and further detail description thereof is deemed unnecessary.

It is to be understood that minor changes in the details of construction and arrangement of parts may be resorted to within the scope of what is claimed without departing from the spirit of the invention.

What is claimed is:—

1. A pick-up and separating machine comprising a main feed chute, an operating table divided into separate compartments, means for picking up articles from said main feed chute, a solid rotatable drum, said last mentioned means being carried by said solid rotatable drum, said solid rotatable drum having pockets to receive said articles, said pockets having discharge openings to deliver said articles to the separate compartments of said operating table, and means for rotating said rotatable means.

2. A pick-up and separating machine comprising a main feed chute, an operating table divided into separate compartments, a solid drum rotatable between said main feeding chute and said operating table, said solid drum being provided with pockets, certain of said pockets opening upon the ends of said drum to deposit articles into side compartments of said operating table, the remaining pockets of said solid drum opening upon the periphery thereof to deposit articles into the inner compartment of said operating table, and pick up members carried by said drum for picking up articles from said main feed chute and depositing the same into the pockets of said solid drum.

3. A pick-up and separating machine comprising a main feed chute, an operating table divided into compartments, a drum rotatable between said main feed chute and said operating table, said drum being provided with pockets opening at various points upon said drum so that articles may be delivered by the drum into the separate compartments of said operating table during rotation of said drum, guide walls for said pockets to direct the articles to the discharge openings thereof, said main feed chute and said operating table having longitudinal slots formed in their opposed ends, and pick up fingers projecting radially from said drum at the sides of said pockets to pick up articles from said main feed chute and deposit the same into the pockets of said drum during rotation of the latter.

4. A pick-up and separating machine comprising a main feed chute having upwardly curved fingers formed at its lower end, an operating table divided into compartments, a drum rotatably mounted between the operating table and main feed chute and provided with pockets for delivering articles to the various compartments of the said operating table, said pockets having guide and guard walls at one side to prevent premature or improper discharge of said articles, and pick up fingers extended radially from the edge of each pocket of said drum and provided with curved and pointed heads at their ends positioned at an angle to the main portion thereof to pick up articles from the main feed chute for the pockets of said drum during rotation of the latter.

5. A pick-up and separating machine comprising a main feed chute, an operating table having compartments formed therein, the main feed chute having side walls pivotally mounted adjacent one end of the chute, the lower end portion of the walls being movable toward and away from one another, and means positioned between the chute and the table for delivering articles from the main feed chute to the various compartments of said operating table.

6. A pick-up and separating machine comprising an inclined main feed chute, an inclined operating table divided into compartments, a rotatable article separating member positioned between said main feeding chute and said operating table and provided with separating pockets adapted to deliver articles into different compartments of said operating table upon rotation of said separating member, guide and guard walls for said pockets, pick up fingers carried by said separating member and adapted to pass through the lower end of the main feeding chute to pick up articles therefrom for the different pockets of said article separating member during rotation of the latter, and means to rotate the said article separating member.

7. A pick-up and separating machine comprising a main feed chute, an operating table divided into compartments, a drum rotatable between said main feed chute and said operating table, said drum being provided with pockets, certain of said pockets opening upon the ends of said drum to deposit articles into side compartments of said operating table, the remaining pockets of said drum opening upon the periphery thereof to deposit articles into the main compartment of said operating table, and transversely curved pick-up members carried by said drum for picking up articles from said main feed chute and depositing the same into the pockets of said drum.

8. A pick-up and separating machine comprising a main feed chute, an operating table divided into compartments, means for picking up articles from said main feed chute and depositing the same upon said table, said means including a rotary drum and pick-up fingers, said pick-up fingers having heads formed on their outer ends to prevent the articles from rolling off of the ends of said fingers, said fingers being transversely curved to prevent articles from rolling off of the sides of the fingers, and means for rotating said drum.

9. A pick-up and separating machine comprising a main feed chute, having upwardly curved fingers formed at its lower end, an operating table divided into compartments, a drum rotatably mounted between the operating table and main feed chute and provided with pockets for delivering articles to the various compartments of the said operating table, said pick-up fingers being curved transversely to prevent articles from rolling off of the sides of the sets of fingers, and means for rotating said drum.

10. A pick-up and separating machine comprising an inclined main feed chute, an inclined operating table divided into compartments, a rotatable article separating member positioned between said main feed chute and said operating table and provided with separating pockets adapted to deliver articles into different compartments of said operating table upon rotation of said separating member, pick up fingers carried by said separating member and adapted to pass through the lower end of the main feed chute to pick up articles therefrom for the different pockets of said separating member during rotation of the latter, said pick up fingers being arranged in sets for said separating pocket and the fingers of each set being curved transversely to prevent articles from rolling off of the sides of said fingers, and means to rotate the said separating member.

In testimony whereof I affix my signature in presence of two witnesses.

GRANVILLE I. KOHR.

Witnesses:
BENJAMIN F. EMENHEISER,
WILLIAM C. EVERHART.